United States Patent [19]

Skatsche et al.

[11] 4,313,405
[45] Feb. 2, 1982

[54] INTERNAL COMBUSTION ENGINE

[75] Inventors: Othmar Skatsche; Heinz Fachbach; Gerhard Thien; Karl Kirchweger; Josef Greier, all of Graz, Austria; Hans List, 126, Heinrichstrasse, Graz, Austria

[73] Assignee: Hans List, Graz, Austria

[21] Appl. No.: 103,291

[22] Filed: Dec. 13, 1979

[30] Foreign Application Priority Data

Dec. 18, 1978 [AT] Austria ................................. 9052/78

[51] Int. Cl.³ .......................... F16M 1/02; F02B 77/00
[52] U.S. Cl. .............................. 123/195 C; 123/195 S; 123/198 E; 181/204
[58] Field of Search ............. 123/195 C, 198 E, 195 S, 123/195 A; 181/204

[56] References Cited

U.S. PATENT DOCUMENTS

| 2,909,031 | 10/1959 | Kiekhaefer | 123/198 E |
| 3,695,386 | 10/1972 | Thien et al. | 123/195 C |
| 4,071,008 | 1/1978 | Skatsche et al. | 123/198 E |
| 4,203,409 | 5/1980 | Fachbach | 123/198 E |
| 4,213,439 | 7/1980 | Feichtinger | 123/198 E |

Primary Examiner—Ira S. Lazarus
Attorney, Agent, or Firm—Watson, Cole, Grindle & Watson

[57] ABSTRACT

In an internal combustion engine comprising a crankshaft (7) and crankshaft main bearings (6), an engine unit support (1) which supports the crankshaft main bearings, and a cylinderhead (3) mounted on the engine unit support (1), which are engine parts directly affected by body resonance and sound vibration, at least one vibration absorbing and power transmitting element (15) located between the engine parts directly affected by sound vibration and the crankcase (8), a sealing element (21) located in a joint between a engine unit support (1) and the crankcase (8) which seals an encapsulated upper dry engine region oil-tightly against a lower oil-wetted engine region (22), an elastic filling element (19) bridging at least a part of the joint being inserted into the joint before the mounting of the sealing element (21) and supporting the latter, whereby the sealing element (21) comprises a viscous material forming an adhesive compound with metal which is resilient after curing. Thus, the rubber material of the vibration absorbing elements (15) can be chosen without regard for the oil-resistance and customary vibration absorbing elements can be used without a specific adaption. Furthermore, this arrangement of the sealing element does not require a specific machining of the surfaces lying close to the sealing element.

2 Claims, 2 Drawing Figures

INTERNAL COMBUSTION ENGINE

BACKGROUND OF THE INVENTION

This invention relates to improvements in an internal combustion engine comprising a crankshaft and crankshaft main bearings, an engine unit support which supports the crankshaft main bearings, and a cylinderhead mounted on the engine unit support, which are engine parts directly affected by body resonance and sound vibration, at least one vibration absorbing and power transmitting element located between the engine parts which are directly affected by sound vibration and the crankcase, a sealing element located in a joint between the engine unit support and a crankcase which seals an encapsulated upper dry engine region oil-tightly against a lower oil-wetted engine region.

DESCRIPTION OF THE PRIOR ART

Internal combustion engines of the kind referred to enable a marked reduction of the sound emission, as the crankcase—which essentially is responsible for the sound emission—is separated by a vibration absorbing element from those parts of the engine which are directly vibration—generating. In a known engine of the aforementioned type machined flanges extend about the engine unit support and the upper brim of the crankcase. Between the machined flanges a frame type vibration absorbing element is arranged, which comprises metal frames lying close to and being fixed to each of the flanges by means of bolts, and an elastic rubber element is vulcanized in between the metal frames. Thereby, the vibration absorbing element acts as a power transmission from the engine unit support to the crankcase supported in a conventional way by the car and simultaneously as a seal for the lower oil-wetted part of the engine. Besides the fact that the frame-type vibration absorbing element must be of a special type, limitations with regard to the selection of the material of the vibration absorbing element must be contended with, since this element must also be resistant to oil and heat. The main disadvantage of this prior art construction of the vibration absorbing element is that the flanges on the engine unit support and on the crankcase must be machined exactly plane and parallel in special operations thereby considerably increasing production costs of the engine.

Furthermore, a sealing element is known which consists of rubber material vulcanized into the joint to be sealed and which is elastic after curing. However, the mounting of this sealing element, or the filling of the joint with the sealing material, respectively, is relatively difficult, particularly as the soaking in of not yet cured rubber material into the crankcase must be prevented.

SUMMARY OF THE INVENTION

It is an object of the present invention to modify engines of the kind referred to in such a way that the aforementioned disadvantages of the known arrangements are avoided and that a reliable and simple mounting of the sealing of the oil-wetted part of the engine is enabled. According to the present invention this can be achieved if an elastic filling element bridging at least a part of the joint is inserted into the joint before the mounting of the sealing element and supporting the latter, and if the sealing element consists of a viscous material forming an adhesive compound with metal which is resilient after curing. To connect the engine unit support to the crankcase one vibration absorbing element extending about the engine unit support or several, for example three or four separate vibration absorbing elements, can be used. The vibration absorbing elements merely need to support the engine unit support and to absorb vibrations; according to the present invention the sealing is carried out by the separate sealing element. As this element is resilient after curing and adheres to the crankcase and the engine unit support, respectively, in the way of a vulcanization, the rubber material of the vibration absorbing elements can be chosen without regard for the oil-resistance. Thus, it is possible to use customary vibration absorbing materials which are readily available in different types without specific adaptation. The arrangement of the sealing element does not require a specific machining of the flanges; cleaning of the surface created by the casting of the crankcase or the engine unit support is sufficient. The disadvantageous machining of the flanges on the crankcase and the engine unit support is not necessary, because the viscous material of the sealing element can easily compensate minor roughness. The elastic filling element supporting the sealing element results in an easy mounting of the sealing element and prevents in particular any leaking in of not yet cured material into the crankcase.

By fitting the filling element to the crankcase and the engine unit support an extended round groove is created, the bottom of which is built by the filling element. Therefore, the filling of this groove with the sealing material is especially simple.

According to another embodiment of this invention the sealing element is located in a clearance, e.g., a groove, running along the joint to be sealed. Thereby, not only an enlarged adhesive area for the sealing element results, but also the position of the sealing element is determined in a simple way and a filling of the sealing material is made considerably easier. The clearance or the groove at the crankcase or the engine unit support, respectively, can be already taken into consideration during the manufacture of these parts, whereby a subsequent machining is not necessary.

DESCRIPTION OF THE DRAWINGS

The present invention will be hereinafter more specifically described with reference to the accompanying drawings wherein.

DESCRIPTION OF THE PREFERRED EMBODIMENT

Figure 1:
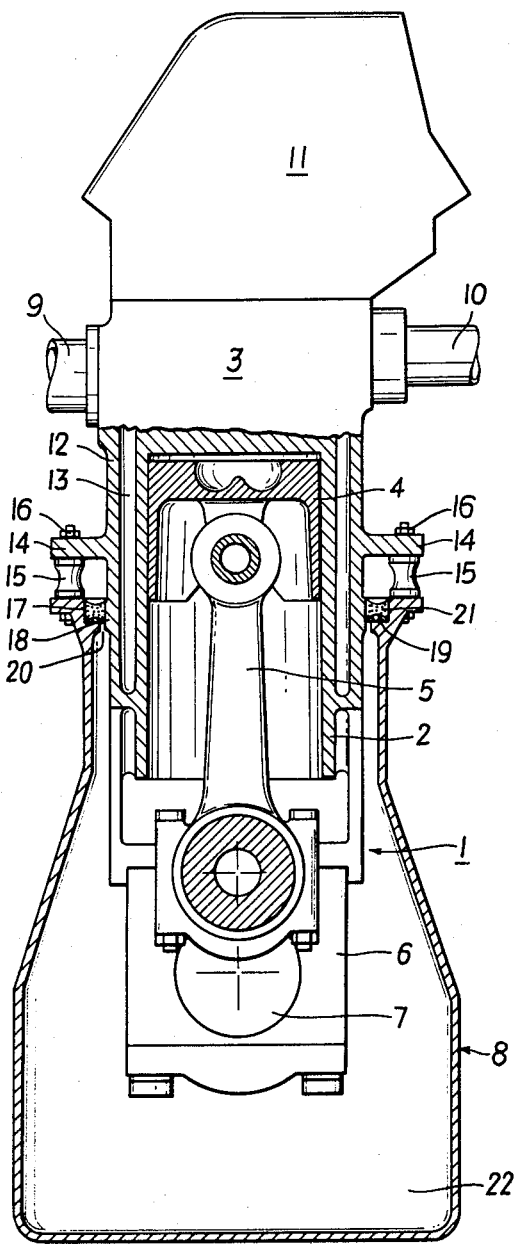
FIG. 1 is a part-sectional view of a schematically depicted internal combustion engine.
Figure 2:
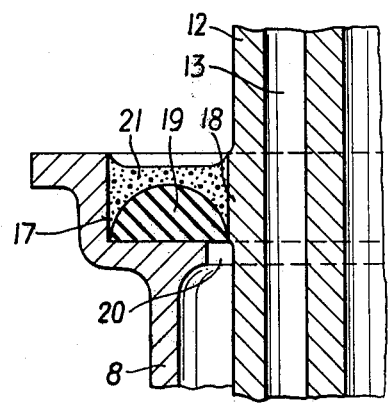
FIG. 2 is a detail of FIG. 1 on an enlarged scale.

The engine comprises an engine unit support 1, including the parts directly affected by body resonance, such as cylinder 2, cylinderhead 3, piston 4, connecting rods 5, crankshaft bearings 6 and crankshaft 7, and a crankcase 8 which is open on its upper side and supports the engine unit support which extends into the crankcase.

An air suction duct 9, an exhaust duct 10 and a camshaft housing 11 are connected in a conventional way to the cylinderhead 3. The engine unit support 1 has, approximately in the middle between the upper and the lower ends of the water jacket 13, integrally casted flanges 14 formed on the outer cylinder jacket 12. Separated vibration absorbing elements 15 are screwed to the crankcase 8 and are fixed to the flanges 14 by means of screws 16. Thus, the power transmission from the engine unit support 1 to the crankcase 8 which can be supported in any customary way (not shown) in a motor vehicle, occurs via the flanges 14 and the vibration absorbing elements 15.

The crankcase 8 has a circumferential clearance 17 formed in the region of the bearing surface of the vibration absorbing elements 15 which is open to the engine unit support 1 and opposed to a small circumferential projection 18 at the engine unit support 1. An elastic filling element 19 is inserted into the clearance 17 and bridges a split 20 between the crankcase 8 and the outer cylinder jacket 12. In principle, this filling element 19 can be of any suitable form but must be made of resilient and oil resistant material. A circumferential groove is formed by the clearance 17 at the crankcase 8, the outer cylinder jacket 12 or the projection 18, respectively, and the filling element 19, into which a viscous material is inserted forming an adhesive compound with metal, namely with the crankcase 8 and the engine unit support 1, in the way of a vulcanization and building a sealing element 21. This material is resilient after curing and adheres to the crankcase and the engine unit support and, therefore, seals the lower oil-wetted part 22 of the engine safely against the upper part. A cold-vulcanizing rubber material, commercially known as "Terostat 33", which is a silicon-caoutchouc product of "Teroson", has proven to be especially suitable. This material is initially viscous, is simple to handle, and cures relatively quickly depending on the thickness of the layer. It remains resilient after curing and adheres tightly to the crankcase and to the engine unit support and, therefore, forms the sealing element 21.

To build up the engine, first the engine unit support 1 is inserted into the crankcase 8 and fixed by means of the vibration absorbing elements 15. Then the filling element 19 is inserted into the clearance 17 at the crankcase 8 which already provides a provisional sealing between the crankcase and the engine unit support. After that, the circumferential groove above the filling element 19 is filled up with the cold-vulcanizing rubber material, whereby, after the curing of the material, the seaing of the oil-wetted part 22 of the engine against the upper part is established. During disassembly of the engine unit support and the crankcase in the case of a repair, the sealing element is simply cut through and is replaced in the manner described above by a new sealing element during reassembly. Thus, it is only required that the adhering surfaces bare be made again.

I claim:

1. An internal combustion engine comprising a crankshaft and crankshaft main bearings, a metallic engine unit support which supports said crankshaft main bearings, and a cylinderhead mounted on said engine unit support, which are engine parts directly affected by body resonance and sound vibration, a metallic crankcase supporting said engine support, at least one vibration absorbing and power transmitting element located between said engine parts which are directly affected by sound vibration and said crankcase, a sealing element located in a joint between said engine unit support and said crankcase, said element sealing an encapsulated upper dry engine region oil-tightly against a lower oil-wetted engine region, and an elastic filling element bridging at least a part of said joint, said filling element underlying said sealing element and supporting the latter, and said sealing element consisting of a viscous material forming an adhesive compound with metal and which is resilient after curing.

2. An internal combustion engine according to claim 1, wherein a continuous groove is defined along said joint, said sealing element being located in said groove.

* * * * *